(12) United States Patent
Yang

(10) Patent No.: US 8,347,023 B2
(45) Date of Patent: Jan. 1, 2013

(54) COMPRESSION BASED WEAR LEVELING FOR NON-VOLATILE MEMORY

(75) Inventor: Xueshi Yang, Cuppertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 404 days.

(21) Appl. No.: 12/571,939

(22) Filed: Oct. 1, 2009

(65) Prior Publication Data

US 2010/0088464 A1 Apr. 8, 2010

Related U.S. Application Data

(60) Provisional application No. 61/103,133, filed on Oct. 6, 2008.

(51) Int. Cl.
*G06F 12/00* (2006.01)
*G11C 11/34* (2006.01)

(52) U.S. Cl. ......... 711/103; 711/E12.001; 711/E12.008; 365/185.33

(58) Field of Classification Search .................. 711/103, 711/E12.001, E12.008; 365/185.33
See application file for complete search history.

(56) References Cited

U.S. PATENT DOCUMENTS

| | | | | |
|---|---|---|---|---|
| 5,805,086 A * | 9/1998 | Brown et al. | .................... | 341/51 |
| 2005/0018768 A1* | 1/2005 | Mabey et al. | .............. | 375/240.2 |
| 2006/0035652 A1* | 2/2006 | Kim et al. | ..................... | 455/466 |
| 2007/0064275 A1* | 3/2007 | Ohk | ......................... | 358/426.01 |
| 2007/0071340 A1* | 3/2007 | Yokose | ......................... | 382/243 |
| 2008/0098160 A1* | 4/2008 | Slyz et al. | ..................... | 711/103 |
| 2008/0159331 A1* | 7/2008 | Mace et al. | ................... | 370/473 |
| 2008/0205788 A1* | 8/2008 | Hattori | ......................... | 382/275 |
| 2009/0074052 A1* | 3/2009 | Fukuhara et al. | ........ | 375/240.01 |
| 2009/0089507 A1* | 4/2009 | Chen et al. | .................... | 711/125 |

* cited by examiner

*Primary Examiner* — Matthew Bradley
*Assistant Examiner* — Mehdi Namazi

(57) ABSTRACT

The present disclosure includes systems and techniques relating to non-volatile memory. Systems and techniques can include obtaining information to store in a non-volatile memory, the information including a data segment, compressing data within the data segment, including pad data in one or more portions of the data segment based on a compression result attained by the compression, and writing data of the data segment.

17 Claims, 6 Drawing Sheets

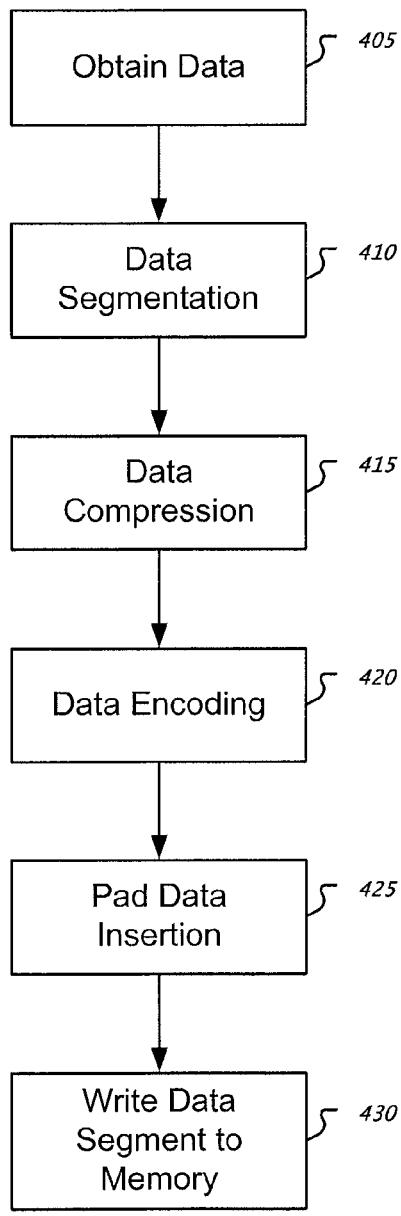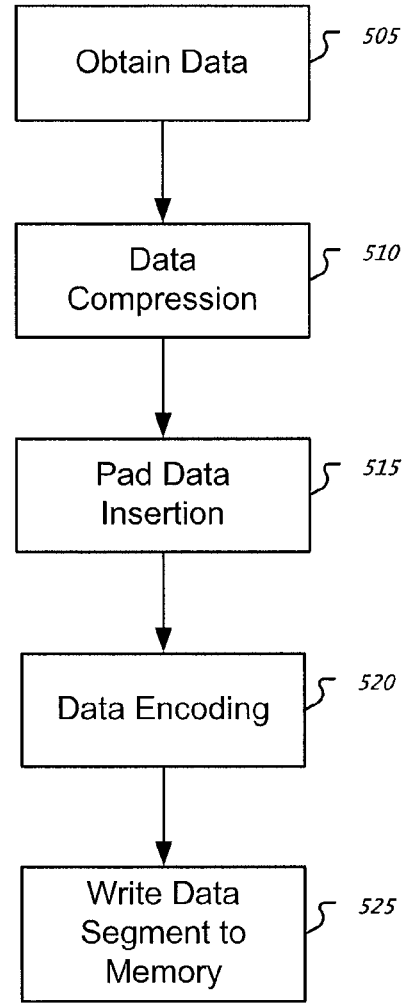
FIG. 4
FIG. 5

COMPRESSION BASED WEAR LEVELING FOR NON-VOLATILE MEMORY

CROSS REFERENCE TO RELATED APPLICATION

This application claims the benefit of the priority of U.S. Provisional Application Ser. No. 61/103,133, filed Oct. 6, 2008 and entitled "Methods and Means for Storing Data to Flash Memory Devices Using Data Compression," the entire contents of which are hereby incorporated by reference.

BACKGROUND

The present disclosure describes systems and techniques relating to non-volatile memory.

Devices and systems can store or retrieve data using non-volatile memory such as flash memory. For example, a digital camera can store an image to non-volatile memory. In another example, a digital media player such as an MP3 player can read a digital audio file from non-volatile memory and play the contents of the audio file. Mobile devices such as a mobile phone or a personal digital assistant (PDA) can read data from and write data to one or more non-volatile memory.

Devices and systems can perform multiple operations on non-volatile memory such as reading and programming operations. Various types of programming operations can include writing and erasing data. Erasing data in such memory can include marking a data area as invalid or not programmed, or can include writing data to a data area to effect an erasure. Non-volatile memory such as flash memory can be divided into multiple data areas. Each data area can be individually addressed and accessed. Accordingly, an operation can include obtaining an address for one or more data areas or a portion of a data area. Also, a data area can be divided into individual bits or larger aggregate data units such as bytes.

SUMMARY

The present disclosure includes systems and techniques for compression based wear leveling of non-volatile memory structures.

Systems and techniques for compression based wear leveling can include obtaining information to store in a non-volatile memory, the information including a data segment; compressing data within the data segment, including pad data in one or more portions of the data segment based on a compression result attained by the compression; and writing data of the data segment.

These, and other aspects, can include one or more of the following features. Including pad data in one or more portions of the data segment can include inserting the pad data in the data segment at an insertion location determined from a programming counter associated with a data sector of the non-volatile memory. Implementations can include cycling through different pad data insertion locations within a data segment to facilitate a distribution of physical write operations to the non-volatile memory. Including pad data in one or more portions of the data segment can include inserting at least a portion of the pad data between different portions of the compressed data. Including pad data in one or more portions of the data segment can include inserting different portions of the pad data at different locations within the data segment. Implementations can include generating error detection information based on the compressed data; and writing the error detection information to the non-volatile memory. Implementations can include generating error detection information based on the compressed data and the pad data and writing the error detection information to the non-volatile memory. Obtaining information to store in the non-volatile memory can include segmenting the information into multiple data segments. Pad data can include one or more bits set to a logical state associated with an erased bit state of the non-volatile memory. Writing data can include writing data of the data segment that are indicative of a non-erased bit state to the non-volatile memory.

The described systems and techniques can be implemented in electronic circuitry, computer hardware, firmware, software, or in combinations of them, such as structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a mobile telephone, a personal digital assistant (PDA), a mobile computer, a digital camera), a general purpose data processing apparatus (e.g., a minicomputer, a server, a mainframe, a supercomputer), or combinations of these.

Thus, according to another aspect of the described systems and techniques, a system can include a non-volatile memory structure configured to store data, a controller, in communication with the non-volatile memory structure, and a processor, in communication with the controller. The processor can be configured to communicate with the non-volatile memory structure via the controller. The controller can be configured to perform operations that include obtaining information to store in the non-volatile memory structure, the information including a data segment; compressing data within the data segment; including pad data in one or more portions of the data segment based on a compression result attained by the compression; and writing data of the data segment to the non-volatile memory structure.

These, and other aspects, can include one or more of the following features. Including pad data in one or more portions of the data segment can include inserting the pad data in the data segment at an insertion location determined from a programming counter associated with a data sector of the non-volatile memory structure. The operations can include cycling through different pad data insertion locations within a data segment to facilitate a distribution of physical write operations to the non-volatile memory structure. Including pad data in one or more portions of the data segment can include inserting at least a portion of the pad data between different portions of the compressed data. Including pad data in one or more portions of the data segment can include inserting different portions of the pad data at different locations within the data segment. The non-volatile memory structure can include flash memory and the logical state can correspond to logical one.

In another aspect, systems and devices can include a non-volatile memory structure configured to store data, and a controller that is in communication with the non-volatile memory structure. The controller can be configured to perform operations that include obtaining information to store in the non-volatile memory structure, the information including a data segment; compressing data within the data segment, including pad data in one or more portions of the data segment based on a compression result attained by the compression; and writing data of the data segment to the non-volatile memory structure.

These, and other aspects, can include one or more of the following features. Including pad data in one or more portions of the data segment can include inserting the pad data in the data segment at an insertion location determined from a programming counter associated with a data sector of the non-volatile memory structure. The operations can include cycling through different pad data insertion locations within a data segment to facilitate a distribution of physical write operations to the non-volatile memory structure. Including pad data in one or more portions of the data segment can include inserting at least a portion of the pad data between different portions of the compressed data. Including pad data in one or more portions of the data segment can include inserting different portions of the pad data at different locations within the data segment. The non-volatile memory structure can include flash memory and the logical state can correspond to logical one.

The subject matter described in this specification can be implemented to realize one or more of the following potential advantages. One or more of the described systems and techniques can increase non-volatile memory life span and can increase non-volatile memory storage device throughput. One or more of the described systems and techniques can minimize current flow within a non-volatile memory during programming operations, which can save power. One or more of the described systems and techniques can improve data storage reliability and can provide a higher level of quality of service.

Details of one or more implementations are set forth in the accompanying drawings and the description below. Other features, objects, and advantages may be apparent from the description and drawings, and from the claims.

DRAWING DESCRIPTIONS

FIG. 4 shows an example of a technique that includes data encoding.

FIG. 5 shows another example of a technique that includes data encoding.

FIGS. 8A, 8B, 8C, and 8D show different examples of data sector transforms that are based on a programming counter.

Like reference symbols in the various drawings indicate like elements.

DETAILED DESCRIPTION

Non-volatile memory structures such as flash memory structures or phase change memory structures may suffer operational disturbances. Under an operational disturbance, storage areas such as data cells may become increasingly unreliable after many operations. Various examples of operations include erasing and programming cycles. Apparatuses and systems can use wear leveling techniques to mitigate the impact of operational disturbances on one or more non-volatile memory structures. This document describes, among other things, wear leveling techniques that can include data compression and data logistics techniques. In general, a memory structure that suffers from operational disturbances may benefit from using one or more of the techniques presented herein.

Flash devices, for example, are subjected to wear due to erase and program (E/P) cycling. Wear can vary based on a complexity of a flash device. For example, some single level cell (SLC) flash devices can sustain on average 100,000 E/P cycles before there is a noticeable impact on performance. Some multi-level cell (MLC) flash devices can sustain on average 10,000 E/P cycles. Wear leveling technologies described herein can extend the life span of flash based storage devices. The described technologies can have additional benefits such as higher throughput and decreased bit-errors. Apparatuses and systems for wear leveling can include a compression and decompression unit and corresponding data management systems.

Memory devices can include a memory cell structure that includes multiple memory cells in an arrangement, e.g., SLC structure or a MLC structure. For example, some flash memory devices can include flash cells organized in an arrangement such as an X-Y array. A device can use a bit line and a word line to address an individual cell in an X-Y array. In some implementations, a flash cell can stay in either an erase state or a program state with some uncertainty around the nominal mean threshold voltage.

Figure 1A:
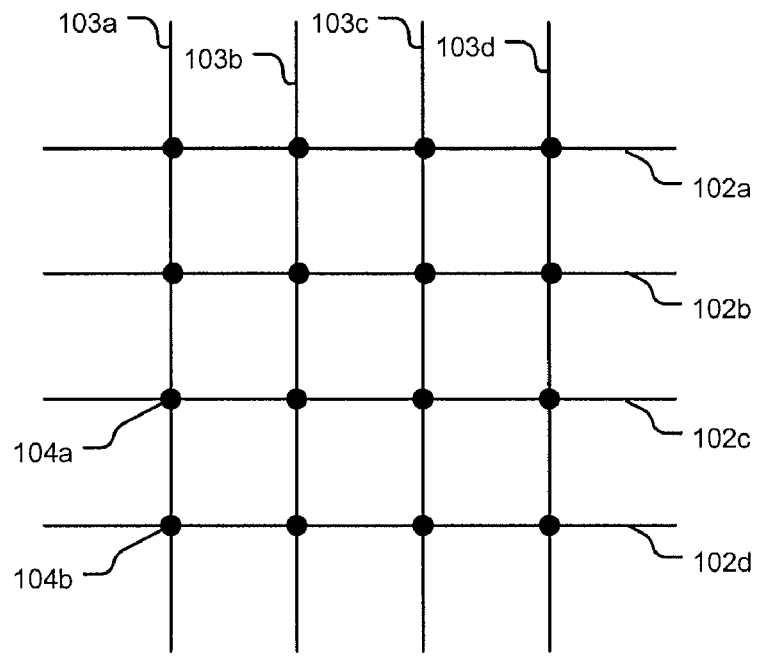
FIG. 1A shows an example of a flash cell structure.

FIG. 1A shows an example of a flash cell structure. A flash memory device can include multiple cells 104a, 104b in an X-Y array arrangement. A cell 104a, 104b can include logic configured to store information. In some implementations, different logic states associated with a cell 104a, 104b can represent different logical values such as a logical 1 or a logical 0. A controller, such as a flash memory controller, can use a bit line 103a, 103b, 103c, 103d and a word line 102a, 102b, 102c, 102d to address an individual cell 104a, 104b.

In some implementations, an erase state is represented by a logical 1 and a program state by logical 0. If a 1-bit is stored in a flash cell such as a cell in an X-Y array, the voltage on a corresponding bit line is raised and programming is prohibited; hence, the cell stays at an erase state. Otherwise, a voltage difference is setup between a corresponding word line and the corresponding bit line to program the flash cell to a zero state. In some implementations, a word line can be associated with a control gate and a bit line can be associated with a drain and source. In some implementations, the voltage difference to effect a cell change is in the range of 5 to 20 volts.

Physical programming and erasing techniques can include an application of current to one or more flash cells. Selective physical programming and erasing techniques can control current flow to a memory such as a flash memory structure. For example, selective physical programming and erasing techniques can limit an amount of current flow from a floating gate to a substrate of a flash memory structure. Selective techniques can mitigate the stress experienced by flash cells. Some flash controllers can perform a selective physical programming of flash cells based on bit states of data to be written to the flash cells and states of the flash cells. Some flash controllers can use additional techniques to minimize current flow to flash cells.

In some flash designs, programming operations can set a flash cell to store a logical one, which can correspond to an erase state. Accordingly, a flash cell that is in an erased state may not require a physical programming operation if the bit to be programmed is logically equivalent to the erased state. In some implementations, a flash cell that is in a logical one state may not require a physical programming operation to represent a logical one. Erase operations can set flash cells to logical ones. Some flash controllers can perform a selective physical erasing of flash cells based on the states of the flash cells. In some implementations, a flash cell that is in a logical one state may not require a physical erasure.

A storage device can use one or more wear leveling techniques in addition to selective physical programming and erasing techniques to extend the life of the memory included in the device. Wear leveling techniques can include performing data compression at a storage device level. Wear leveling techniques can utilize the reduced data size provided by data compression to insert pad data such as pseudo data to maintain the length of the original uncompressed data sector. Such techniques can improve device performance, can extend cell life spans, and can increase device throughput.

A host device can read and write data to a storage device that uses one or more wear leveling techniques. The host device can address one or more logical segments in a read or write operation. A storage device can use a fixed or configurable data segment size which can be obtained or determined by the host device for addressing the storage device. A storage device can alter data as it is being written to memory to improve device performance. To provide transparency to a host device, a storage device can translate between internal and external data representations.

Compression results for different input data segments can vary. For example, an attained compression ratio, e.g., a ratio between uncompressed size and compressed size, can be different. Despite this, a wear leveling and data compression technique can maintain an input data segment size to reduce data management and index complexity. A storage device can include pad data in a compressed data segment based on an attained compression ratio to maintain an input data segment size. For example, a storage device can include an amount of pad data equal to the difference between the uncompressed size and compressed size. Some devices can use pseudo data such as logical ones as pad data to minimize current flow in the device's memory.

Figure 1B:
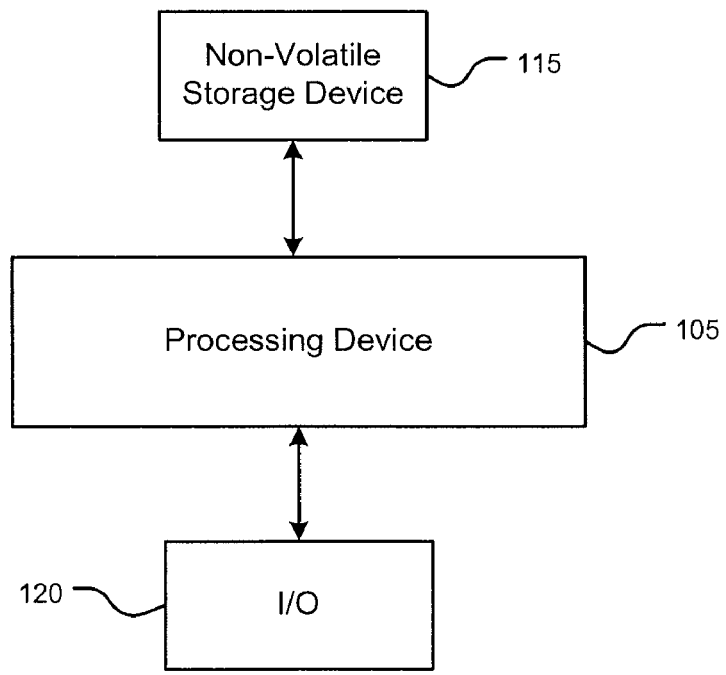
FIG. 1B shows an example of a system with non-volatile memory.

FIG. 1B shows an example of a system with non-volatile memory that can perform one or more techniques described herein. A system can include a data processing device with embedded or removable non-volatile memory. A data processing device such as a digital media player, digital camera, personal data assistant (PDA), mobile phone, computer, or embedded device can include one or more of non-volatile storage device 115 that can include one or more flash memory structures, processing device 105, and input/output (I/O) 120 channel(s) and connection(s) such as video/audio/image input, text input, positioning input, or video/audio/image output. In some implementations, processing device 105 can include one or more processors or specialized processing logic. In some implementations, processing device 105 can include a memory that stores instructions to operate a processor to interact with a non-volatile storage device 115.

Processing device 105 can read from and/or write to the non-volatile storage device 115. For example, data received from I/O 120 can be stored on the non-volatile storage device 115. In another example, content from a file retrieved from the non-volatile storage device 115 can be digitally reproduced as output on I/O 120. In some implementations, a removable unit can contain the non-volatile memory structure 115. In some implementations, non-volatile storage device 105 can include processor electronics.

In some implementations, a processing device 105 can access a non-volatile storage device 115 based on a data segment such as a data sector(s). A data sector can include a fixed amount of data, e.g., a fixed number of bytes. In some implementations, a processing device 105 can write data such as a logical data sector to a non-volatile storage device 115, and in turn, a non-volatile storage device 115 can write data to a physical data sector, e.g., a grouping of memory cells.

Figure 2:
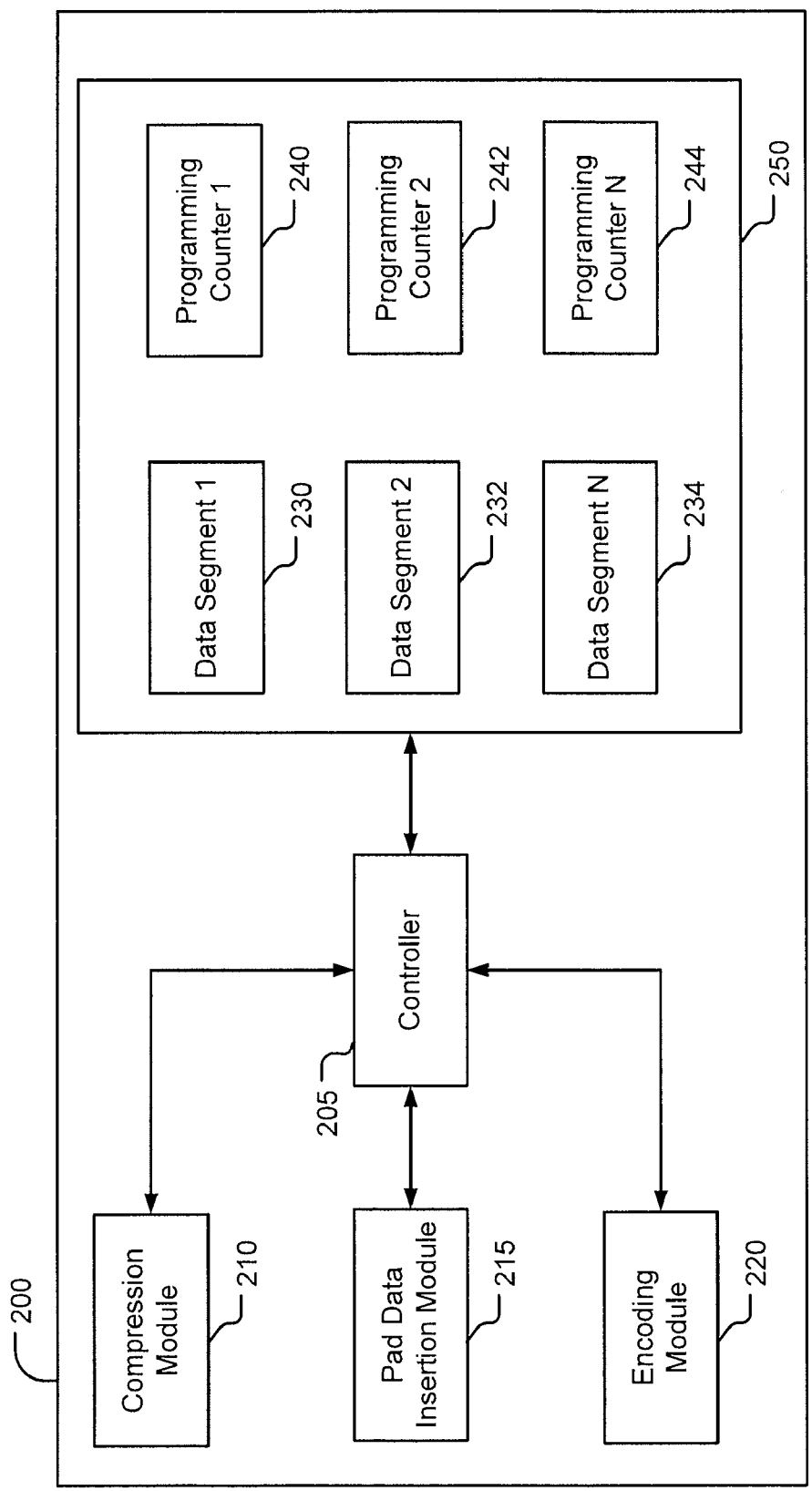
FIG. 2 shows an example of a storage device architecture.

FIG. 2 shows an example of a storage device architecture. A storage device architecture 200 can include a controller 205, compression module 210, pad data insertion module 215, encoding module 220, and a non-volatile memory structure 250. A controller 205 can obtain data from an external source such as a processor or a computer and can store the data to one or more data segments 230, 232, 234 in a non-volatile memory structure 250. A controller 205 can read data from one or more data segments 230, 232, 234 and can send data to an external source such as a processor or a computer.

The controller 205 can interface with a compression module 210, pad data insertion module 215, and encoding module 220, and one or more memory structures such as a non-volatile memory structure 250. In some implementations, compression module 210 can perform compression and decompression, pad data insertion module 215 can insert and remove pad data, and an encoding module 220 can encode data and process retrieved encoded data for error detection and correction. In some implementations, a controller 205 can include one or more of compression module 210, pad data insertion module 215, and an encoding module 220. In some implementations, a controller 205 can include a non-volatile memory structure 250.

A storage device architecture 200 can include one or more memory structures that are configured to store data, e.g., a non-volatile memory structure 250. A non-volatile memory structure 250 can be configured to store operational data such as programming counters. For example, a non-volatile memory structure 250 can store programming counter values 240, 242, 244 associated with respective data segments 230, 232, 234 to count programming operations. A controller 205 can use a programming counter value 240, 242, 244 for an input to a pad data insertion module 215. A storage device architecture 200 can be implemented using different configurations. Various examples of such configurations include implementations of a storage device architecture 200 on a single integrated circuit die, on multiple dies with a single chip package, and on multiple dies in respective chips in a device package.

Figure 3:
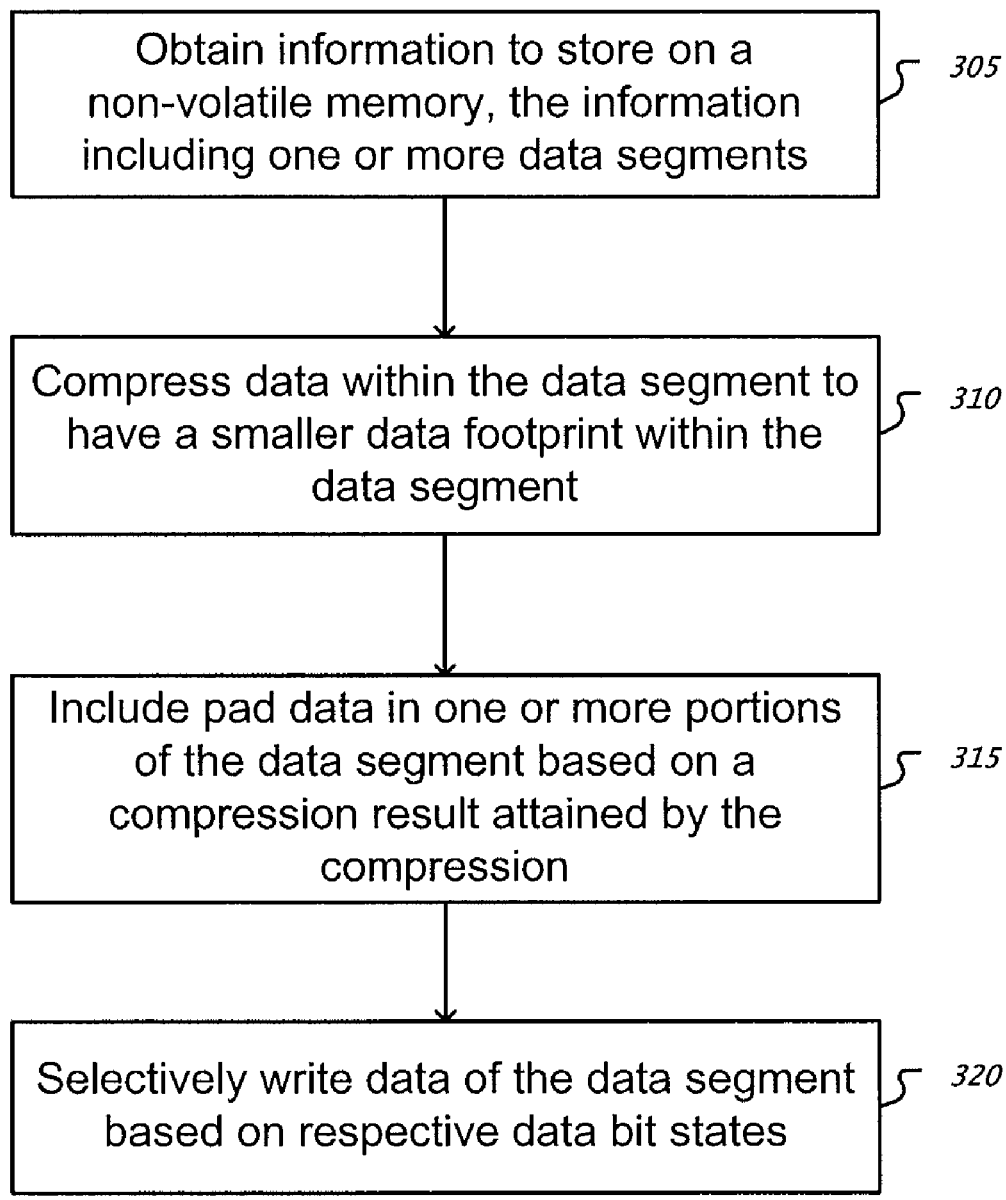
FIG. 3 shows an example of a wear leveling technique that includes data compression and pad data inclusion.

FIG. 3 shows an example of a wear leveling technique that includes data compression and pad data inclusion. At 305, a wear leveling technique can include obtaining information to store on a non-volatile memory. The information can include one or more data segments. Obtaining information to store on the non-volatile memory can include segmenting the information into multiple data segments.

The technique can include at 310 compressing data within the data segment to have a smaller data footprint within the data segment. A device can compress data in place or can generate a new data structure, such as a second data segment, that includes the compressed data. The device can distribute the compressed data within the data segment to leave space for including pad data.

Compressing data can include using one or more data compression algorithms. Various examples of compression techniques include block-block, block-variable, variable-block, variable-variable. In some block-block data compression algorithm implementations, source words and code words can be of fixed length. In some variable-variable data compression algorithm implementations, source words and code words can be of variable length. Various examples of data compression algorithms include Shannon-Fano codes, Static Huffman codes, Adaptive Huffman codes, Fibonacci codes, Arithmetic codes, and Lempel-Ziv codes.

After compression, the size of a compressed segment can be smaller than the designated space assigned by the device. A device can use a compression ratio to control an amount of pad data that is inserted into the data segment. At 315, pad data can be included in one or more portions of the data segment using a compression result attained by the compression.

At 320, the technique can include selectively writing data of the data segment based on respective data bit states to a non-volatile memory. In some implementations, pad data can include one or more bits set to a logical state associated with an erased bit state of the non-volatile memory. A device can write data of the data segment that are indicative of a non-erased bit state to a data segment of the non-volatile memory.

In some implementations, storage devices can generate error detection information based on the compressed data. In some implementations, storage devices can generate error detection information based on the compressed data and the pad data. Storage devices can write data and corresponding error detection information to one or more areas in a non-volatile memory. In some implementations, error detection information can include information to correct data errors.

FIG. 4 shows an example of a technique that includes data encoding. At 405, a storage device can obtain data to store from a source such as a host device or a host processor. In some implementations at 410, a storage device can segment input data into one or more logical data sectors. Various examples of data sector size values include 512 Bytes and 1024 Bytes and other values.

In some implementations at 415, logical segment data can enter a data compression unit, which can reduce the size of the data contained in the input segment. At 420, compressed data can undergo one or more encodings such as error correction encoding (ECC). At 425, pad data can be inserted into the free space of a compressed data segment to maintain a constant sector size. At 430, a controller can write the data segment to non-volatile memory. Some storage devices can encode only the compressed data. However, some storage devices can encode both the compressed data and the inserted pseudo data.

FIG. 5 shows another example of a technique that includes data encoding. At 505, a storage device can obtain data to store from a host. In some implementations, the host can provide data in a segmented format to the storage device. At 510, the device can compress each segment provided by the host. At 515, pad data such as logical 1s can be inserted into the compressed data segment to maintain a constant segment size. At 520, the device can encode one or both of the compressed data and inserted pad data. At 525, the device can write the data segment to non-volatile memory.

Figure 6:
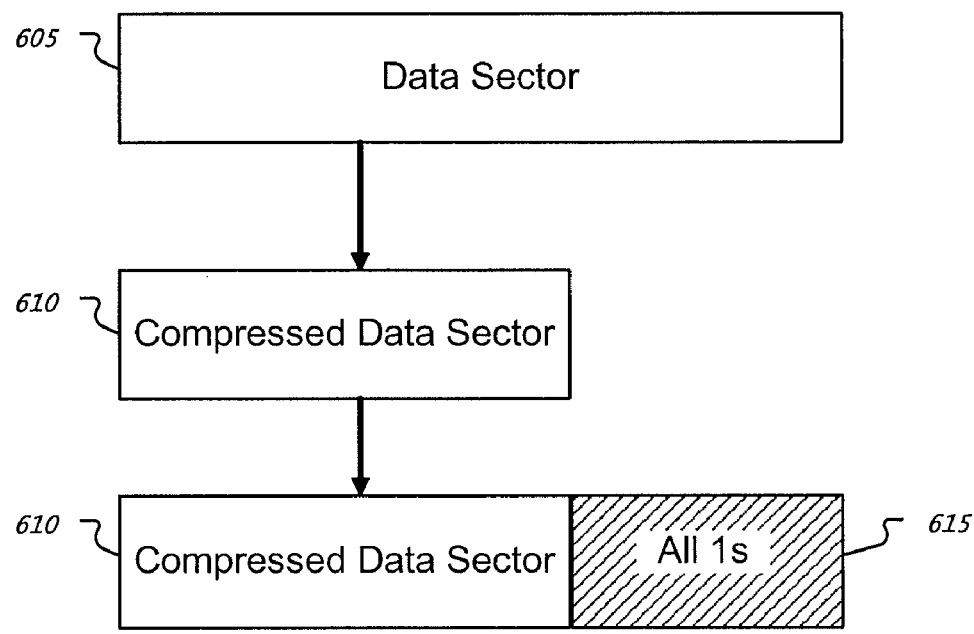
FIG. 6 shows an example of a transformation of an input data sector.

FIG. 6 shows an example of a transformation of an input data sector. A compression module can transform an input data sector 605 into a smaller compressed data sector 610. A pad data insertion module can insert a pad data portion 615 in a space created by the compression module. A controller can write the compressed data sector 610 and the pad data portion 615 to a data area in a memory. In some implementations, encoding information associated with the compressed data sector 610 can be stored in an adjacent area.

Figure 7:
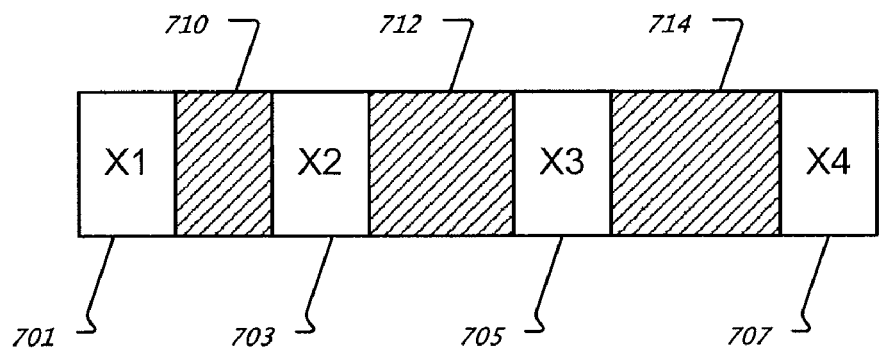
FIG. 7 shows an example of a transformed data sector.

FIG. 7 shows an example of a transformed data sector. Compressed data can be split into different data portions such as data portions X1, X2, X3, and X4 (701, 703, 705, 707 respectively). Pad data 710, 712, 714 can be inserted between the data portions 701, 703, 705, 707. Other layouts of compressed data and pad data are possible.

The positioning of pad data in one or more portions of a data segment can vary. Some storage devices can insert pad data at an insertion location determined from a programming counter associated with an area of a memory such as a physical sector. In some implementations, a programming counter associated with a physical sector is incremented when data is written to the physical sector. Some devices can cycle through pad data insertion locations. Cycling through different pad data insertion locations within a data sector can distribute wear to a physical sector.

FIGS. 8A, 8B, 8C, and 8D show different examples of data sector transforms that are based on a programming counter. Different values 802, 804, 806, 808 of a programming counter associated with a physical sector of a memory can cause a controller to insert pad data 810, 815, 820, 830 at different locations in the physical sector on different write operations to the same physical sector. For example, a starting location offset for an insertion of pad data can be incremented by a fixed or configurable amount for one or more successive write operations to the same physical sector.

Figure 8A:
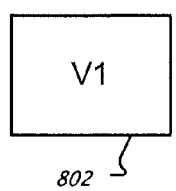
Figure 8A:
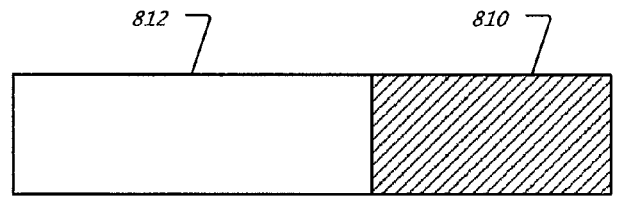
Figure 8B:
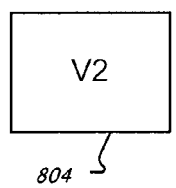
Figure 8B:
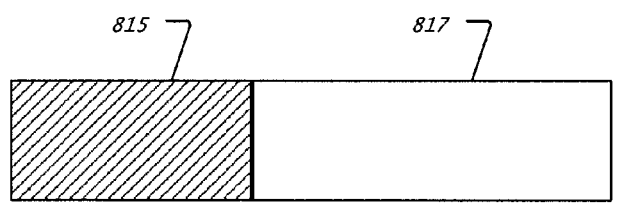
Figure 8C:
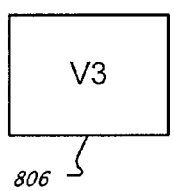
Figure 8C:
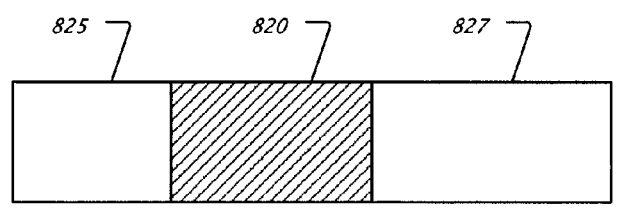
Figure 8D:
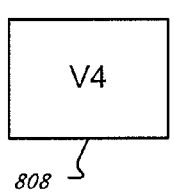
Figure 8D:
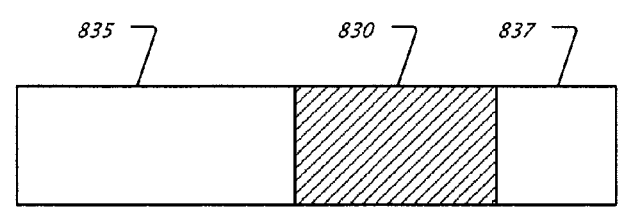

In FIG. 8A, pad data 810 is inserted after compressed data 812. In FIG. 8B, pad data 815 is inserted before compressed data 817. In this example, the compressed data 817 is shifted to the right to maintain sector boundaries to facilitate an insertion of pad data 815. In FIG. 8C, pad data 820 is inserted between two compressed data portions 825, 827. In FIG. 8D, pad data 830 is inserted at a different location between two compressed data portions 835, 837.

In some implementations, a controller can store metadata information regarding a location of inserted pad data. The controller can use the metadata to remove pad data. In some implementations, a controller can store metadata information regarding a location(s) of compressed data in a sector.

In some implementations, logical sector data can undergo one or more encodings such as ECC. In some implementations, encoded data can enter a data compression unit, which may shrink the size of the encoded data sector. After data compression, pseudo data such as logical 1s can be inserted into the compressed data sector so the sector size is constant and is consistent with the size accepted by a flash device, e.g., 4 KB+128 Bytes. The formatted data sector can be written to a flash memory. Pad data such as pseudo data can be inserted in a one of a variety of different patterns. In some implementations, pad data can include data other than logical 1s.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Other embodiments fall within the scope of the following claims.

What is claimed is:

1. A method, comprising:
    obtaining information to store in a non-volatile memory, the information comprising a data segment;
    compressing data within the data segment;
    including pad data in one or more portions of the data segment based on a compression result attained by the compression;
    writing data of the data segment; and
    cycling through different pad data insertion locations within the data segment to facilitate a distribution of physical write operations to the non-volatile memory.

2. The method of claim 1, wherein including pad data in one or more portions of the data segment comprises inserting the pad data in the data segment at an insertion location determined from a programming counter associated with a data sector of the non-volatile memory.

3. The method of claim 1, wherein including pad data in one or more portions of the data segment comprises inserting at least a portion of the pad data between different portions of the compressed data.

4. The method of claim 1, wherein including pad data in one or more portions of the data segment comprises inserting different portions of the pad data at different locations within the data segment.

5. The method of claim 1, further comprising:
    generating error detection information based on the compressed data; and
    writing the error detection information to the non-volatile memory.

6. The method of claim 1, further comprising:
    generating error detection information based on the compressed data and the pad data; and
    writing the error detection information to the non-volatile memory.

7. The method of claim 1, wherein obtaining information to store in the non-volatile memory comprises segmenting the information into multiple data segments.

8. The method of claim 1, wherein the pad data comprises one or more bits set to a logical state associated with an erased bit state of the non-volatile memory, wherein writing data comprises writing data of the data segment that are indicative of a non-erased bit state to the non-volatile memory.

9. An apparatus, comprising:
    a non-volatile memory structure configured to store data; and
    a controller, in communication with the non-volatile memory structure, configured to perform operations comprising:
        obtaining information to store in the non-volatile memory structure, the information comprising a data segment;
        compressing data within the data segment;
        including pad data in one or more portions of the data segment based on a compression result attained by the compression;
        writing data of the data segment to the non-volatile memory structure; and
        cycling through different pad data insertion locations within the data segment to facilitate a distribution of physical write operations to the non-volatile memory structure.

10. The apparatus of claim 9, wherein including pad data in one or more portions of the data segment comprises inserting the pad data in the data segment at an insertion location determined from a programming counter associated with a data sector of the non-volatile memory structure.

11. The apparatus of claim 9, wherein including pad data in one or more portions of the data segment comprises inserting at least a portion of the pad data between different portions of the compressed data.

12. The apparatus of claim 9, wherein including pad data in one or more portions of the data segment comprises inserting different portions of the pad data at different locations within the data segment.

13. The apparatus of claim 9, wherein the non-volatile memory structure comprises flash memory, wherein the logical state corresponds to logical one.

14. A system comprising:
- a non-volatile memory structure configured to store data;
- a controller, in communication with the non-volatile memory structure, configured to perform operations comprising:
    - obtaining information to store in the non-volatile memory structure, the information comprising a data segment;
    - compressing data within the data segment;
    - including pad data in one or more portions of the data segment based on a compression result attained by the compression;
    - writing data of the data segment to the non-volatile memory structure; and
    - cycling through different pad data insertion locations within a data segment to facilitate a distribution of physical write operations to the non-volatile memory structure; and
- a processor, in communication with the controller, the processor configured to communicate with the non-volatile memory structure via the controller.

15. The system of claim 14, wherein including pad data in one or more portions of the data segment comprises inserting the pad data in the data segment at an insertion location determined from a programming counter associated with a data sector of the non-volatile memory structure.

16. The system of claim 14, wherein including pad data in one or more portions of the data segment comprises inserting at least a portion of the pad data between different portions of the compressed data.

17. The system of claim 14, wherein including pad data in one or more portions of the data segment comprises inserting different portions of the pad data at different locations within the data segment.

* * * * *